United States Patent [19]

Miyoshi

[11] Patent Number: 4,541,759

[45] Date of Patent: Sep. 17, 1985

[54] PORTABLE ELECTROMAGNETIC DRILLING MACHINE

[75] Inventor: Akio Miyoshi, Hiroshima, Japan

[73] Assignee: Sankyo Co., Ltd., Japan

[21] Appl. No.: 556,491

[22] Filed: Nov. 30, 1983

[30] Foreign Application Priority Data

Nov. 30, 1982 [JP] Japan .......................... 57-182399[U]

[51] Int. Cl.[4] .............................................. B23B 45/14

[52] U.S. Cl. ................................ 408/76; 408/241 G; 408/712

[58] Field of Search ..................... 408/76, 1 R, 61, 67, 408/241 R, 241 G, 712; 409/134, 135, 136, 137, 181

[56] References Cited

U.S. PATENT DOCUMENTS

| | | | |
|---|---|---|---|
| 1,630,835 | 5/1927 | Doyle | 408/7 |
| 2,876,663 | 3/1959 | Buck | 408/76 |
| 3,791,755 | 2/1974 | Warren | 408/76 |

*Primary Examiner*—Z. R. Bilinsky
*Attorney, Agent, or Firm*—William A. Drucker

[57] ABSTRACT

The invention concerns a portable electromagnetic pneumatic power drill. It may be used to make rivet or bolt holes in structural steel girders in guilding and bridge construction. The base of the drill stand is secured to the steel workpiece by electromagnetism. Exhaust air from the drill head cools the electromagnetic base as well as the bit and workpiece. Drill chips are diverted by the exhaust stream and deflected from the rack slide mechanism by a shield. This allows the slide to approach the base and workpiece very closely to improve steadiness and accuracy of drilling.

3 Claims, 6 Drawing Figures

PORTABLE ELECTROMAGNETIC DRILLING MACHINE

BACKGROUND OF THE INVENTION

A conventional portable drill having an electromagnetic base is shown in FIGS. 1 and 2. The electromagnetic base is designated 1. The alternating current rectifier for the base power supply is designated 2. The base 1 is applied to the workpiece to be drilled 8. On the drill stand is a slide support 3 which includes a dovetail groove open at both ends in which a rack slide rod 6 moves to and from the workpiece and supports the electric drill head 7. The rack gear t is driven by a spur gear 5 on rotating the journalled three arm handle 4.

When the portable electromagnetic drilling machine is applied to a workpiece 8 to be drilled, as seen in FIG. 2, chips 9 are generated by the drill bit, near the area P below the slide support 3 and the rack slide rod 6. To avoid damage to the drill stand from chips, particularly damage to the slide rod 6 and the dovetail groove in support 3, prior art construction limited the extent of the support 3 in the direction of the workpiece to about half the distance from the highest level of the drill head to the workpiece. This is shown in FIG. 1 as H/2. Thus the support 3 ends high above the workpiece 8.

A disadvantage of the above construction is seen when the handle 4 is turned to lower the electric drill 7 and the drill bit is not guided in a stable path to engage the workpiece 8 with maximum accuracy.

In a conventional portable electromagnetic drill stand the electromagnetic base 1 is of comparatively large size to provide stability.

An advantage of a large electromagnetic base is that heat is disapated from the insulation around the electromagnet coils and this avoids early burnout of the coils. On the other hand a large magnetic base prevents having a machine of small compact size and moreover may make handling inconvenient.

OBJECT OF THE INVENTION

The purpose of the present invention is to avoid the above problems. A principal object is to avoid damage from chips to the dovetail groove in the slide support and to the slide rod. An object is to provide long supported travel of the slide rod to improve accuracy of drilling. Another object is to reduce the size of the electromagnetic base without reduction of applied electromagnetic force. A further object is to provide a drill stand which is small in size and of light weight to allow ease of manipulation and to provide improved utility.

To provide solutions to the above objects and others the following account sets forth the best mode known to the inventor for carrying out his invention.

DESCRIPTION OF THE PREFERRED EMBODIMENT

Figure 1:
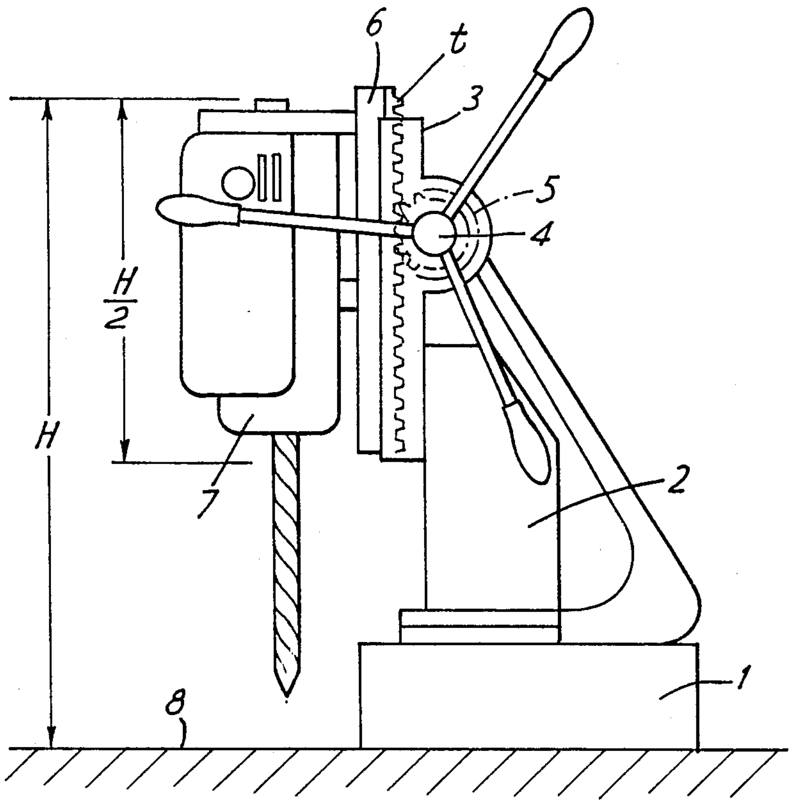
FIG. 1 PRIOR ART
FIG. 1 shows a side view of a conventional prior art portable electromagnetic drilling machine.
Figure 2:
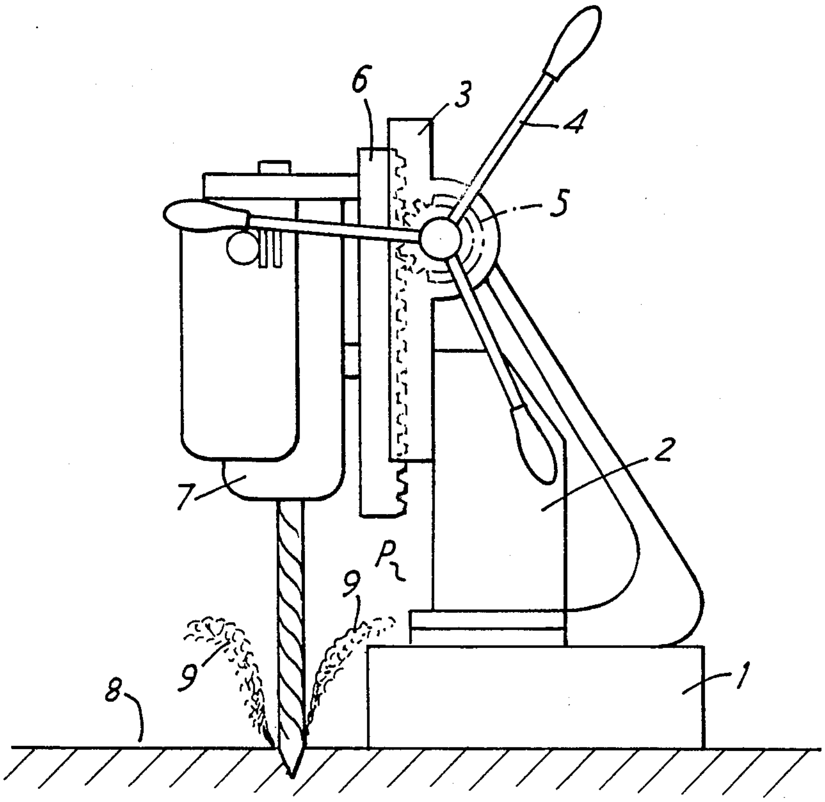
FIG. 2 PRIOR ART
FIG. 2 shows the machine of FIG. 1 in operation.
Figure 3:
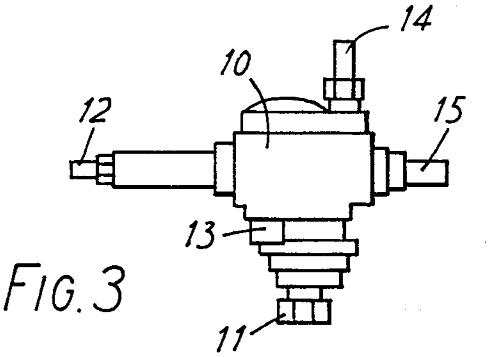
FIG. 3 shows a pneumatically driven drill head as used in the present invention.

In the present invention a pneumatic drill head as seen in FIG. 3 replaces the conventional electric drill 7 of FIG. 1. In the pneumatic head are the drill body 10, the chuck 11, the air inlet 12, the air discharge outlet 13 and the mounting means 14 and 15 for attachment of the head to the magnetic drill stand.

Figure 4:
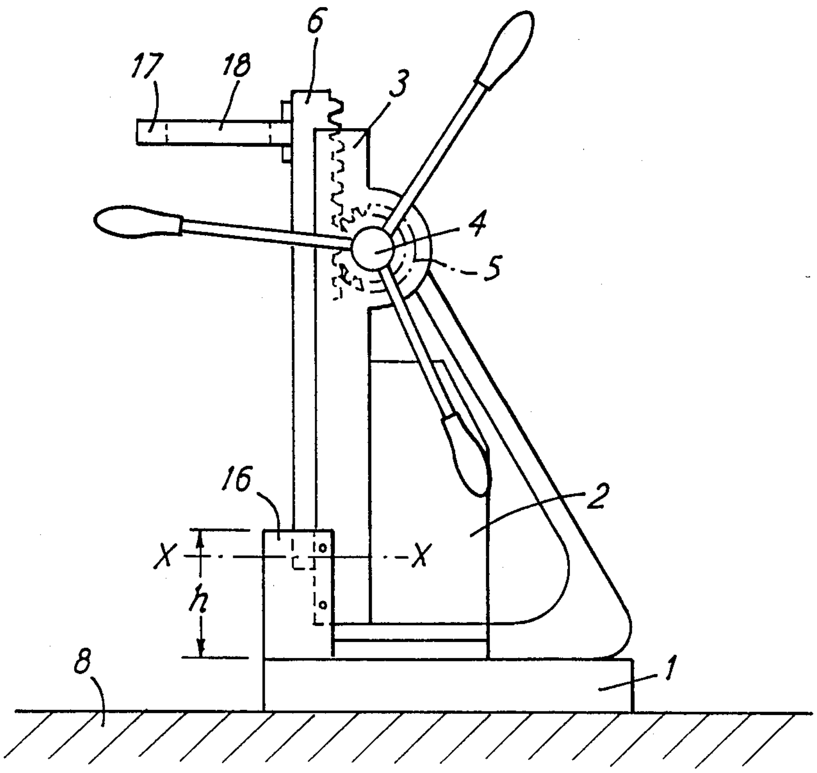
FIG. 4 shows a side view of the magnetic drill stand of the present invention.
Figure 5:
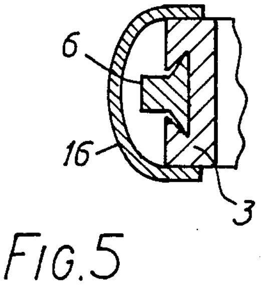
FIG. 5 is a section through line x—x of FIG. 4.

The magnetic drill stand used in the present invention is shown in FIGS. 4 and 5. The stand includes the electromagnetic base 1, a rectifier box 2, a slide support 3, a slide rod 6 and a handle 4 to control the movement of the drill head body 10.

The overall construction and operation of the vertical drive and control including the spur gear 5 moving the side rod 6 by a rack in a dovetail groove in the slide support 3 is similar to conventional prior art devices. However, in the present invention the slide support member 3 extends towards the workpiece 8 to a position just above the electromagnetic base 1, which itself may be more shallow than massive conventional bases. Moreover, a chip deflection shield 16 is provided in this embodiment at the distal end of the support member 3. The distal end of the shield extends to less than a base thickness from the proximal upper edge of said base 1. The proximal edge of the shield 16 may extend twenty centimeters above the base 1.

The support bracket 17 for the drill head 10 includes a junction slot 18 and is integral with the rigid slide rod 6 which tracks in the dovetail groove perpendicular to the base 1, on the rigid slide support member 3.

The present electromagnetic base may be thirty to fifty percent smaller than conventional devices of the same magnetic force. This is possible because a current of exhaust air from the pneumatic drill 10 cools the base 1 and the electromagnetic coils can be reduced about forty percent because they now operate at a lower temperature.

Figure 6:
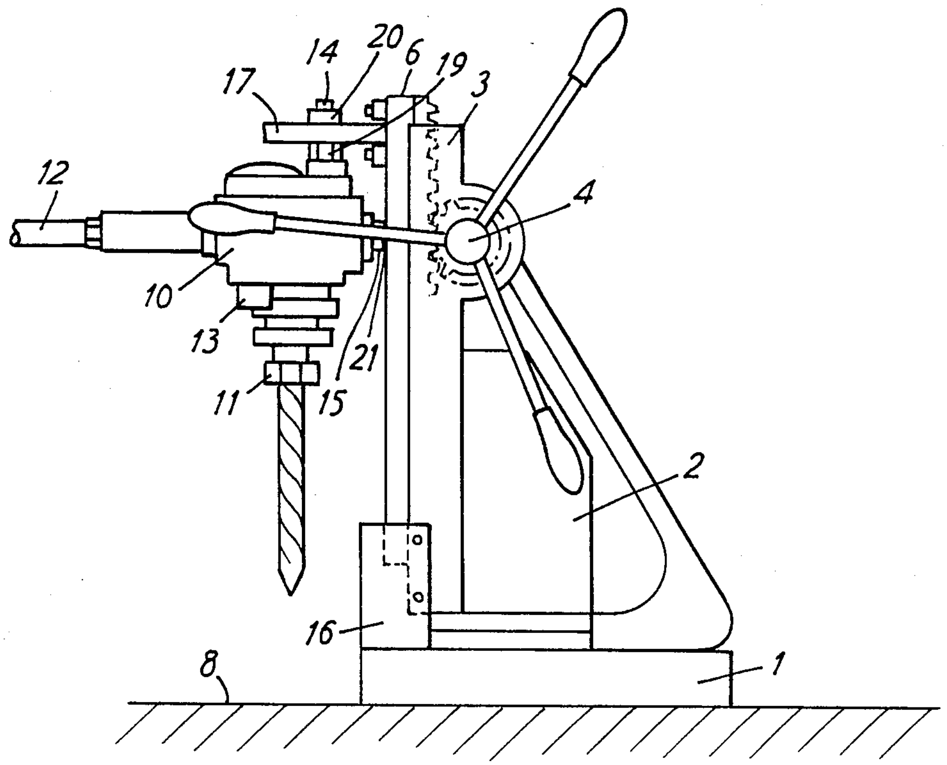
FIG. 6 shows a side view of the stand of FIG. 4 with the drill head and bit installed.

FIG. 6 shows the pneumatic drill head mounted on the stand. The mounting plug 14 engaged the slot 17 in the bracket 17 and is secured by nuts 19 and 20.

Further support is provided for the drill head 10 by an adjustable chuck nut 21 which extends from the mounting 15 into the dovetail groove of the slide rod 6.

Air exhausted from the pneumatic drill head 10 is cooled by adiabatic expansion and directed onto the electromagnetic base 1 so that for equal electromagnetism the base can be reduced in size from thirty to fifty percent. Since pneumatic drills are about half the weight of electric drills for equal power, the weight reduction of both the drill and the base in this invention renders the entire assembly smaller in size and lighter in weight than an electric drill and electromagnetic base of similar power.

Operation of a conventional electric drill with a magnetic base carries a risk of drill chips jamming between the bit and workpiece which may dislocate the drill stand, damage the equipment or injure the operator. Because the moment of inertia of pneumatic drills is about twenty percent less than electric drills, this risk of machine damage or operator injury is reduced and the device is easier to handle.

Finally, according to the present invention, the slide support member 3 extends towards the electromagnetic base 1 and the workpiece 8 a distance nearly to the workpiece 8 and provides improved control of the drill bit and greater drilling accuracy through better support of the drill by elimination of excess bending moment. The dovetail groove is protected from drill chips by a shield 16 so that the slide rod does not jam with chips and chips are blown away by pneumatic exhaust. This also improves the drilling accuracy.

I claim:

1. A portable electromagnetic drilling machine comprising the combination of:

(a) a pneumatically driven drill head and drill bit secured to a portable drill stand which includes a rigid upright frame member;

(b) an electromagnetic base attached to said frame which engages a magnetic workpiece and is provided with pneumatic cooling means exhausted from said drill head; and (c) a movable drill head support tracking perpendicular to said base on said rigid member, including means supporting said drill head, and moving said drill head and bit toward and away from said base and workpiece along said upright member.

2. A machine as claimed in claim 1 which includes means for deflecting drill ships arising from drilling by directing a stream of air exhausted from said drill head onto the workpiece.

3. A machine as claimed in claim 2 which includes means deflecting air driven drill chips arising from drilling from said rigid member, comprising a shield interposed between said bit and movable support, said shield extending to less than a base thickness from said base.

* * * * *